3,098,822
LUBRICANTS PREPARED FROM ISO-OLEIC ACID
Arnold J. Morway, Clark, N.J., assignor to Esso Research and Engineering Company, a corporation of Delaware
No Drawing. Filed July 1, 1960, Ser. No. 40,137
6 Claims. (Cl. 252—39)

This invention relates to lubricants. Particularly, the invention relates to lubricants having good extreme pressure properties and suitable for high temperature use containing alkaline earth metal salt of $C_2$ to $C_4$ fatty acid and alkaline earth metal soap of elaidic acid.

Recently, a very low price fatty acid material comprising chiefly elaidic acid with minor amounts of oleic acid (9-octadeceneoic acid), and other isomers of oleic acid, e.g. 12-octadeceneoic acid and linoleic acid, etc. has become commercially available under the general name of iso-oleic acid. This acid primarily differs from pure oleic acid in that its chief component, i.e. elaidic acid, is in the cis or syn isomeric form, rather than in the more common trans or auto form of oleic acid.

Attempts to utilize elaidic acid or iso-oleic acid to prepare simple soap greases result in compositions which are of no value because they are extremely hard and rubbery. If this grease is cut-back with additional oil, in order to overcome its extreme cohesiveness and rubbery characteristics, then fluid thixotropic products are formed which have no grease structure. These diluted products are very unstable and separation of soap and oil occur in a relatively short time. If the iso-oleic acid is employed in combination with the usual grease-making acids or fats, even in small amounts, it still imparts undesirable cohesive and rubbery characteristics.

Although unsuccessful for soap greases per se, it has been found that soaps of iso-oleic acid can be utilized in combination with salt of $C_2$ to $C_4$ fatty acids, particularly acetic acid or acetic anhydride, to form highly useful lubricating greases. These new greases are superior to corresponding soap-salt greases prepared with conventional saturated fatty acids in regard to extreme pressure properties and lubrication life. Furthermore, soap-salt compositions prepared with the iso-oleic acid do not form hard crusts upon storage as occurs when using saturated acids. Another advantage of the iso-oleic grease of the invention is its ability to harden under high rates of shear such as frequently occur in ball bearings. Thus, a grease of the invention made up to a Number 2 (National Lubricating Grease Institute) consistency will shear harden sufficiently to be pushed out of the ball path. By this action a reservoir of lubricant remains for long periods of excellent lubrication, but does not remain in the ball path where it would be churned, thereby causing excessive power loss and high temperature. Soap-salt greases prepared from iso-oleic acid are also superior to corresponding soap-salt greases prepared from conventional oleic acid (trans form) with regard to thickening power, and hardening under shear in ball bearings.

The iso-oleic acid may be 100% oleic acid in the cis form, i.e. elaidic acid. However, commercial iso-oleic acid generally constitutes mixtures of a major amount of elaidic acid with minor amounts of oleic acid (i.e. 9-octadeceneoic acid) and other related acids such as 12-octadeceneoic, linoleic, linolic, stearic, palmitic, etc.

A commercial iso-oleic acid, available under the trade name of Emery 3286–S acid, was used in the working examples of the invention. This acid had the following characteristics:

| | |
|---|---|
| Titer,[1] ° C | 30 |
| Iodine valve (Wijs) | 94.0 |
| Free fatty acids (percent as oleic) | 91.6 |
| Acid value | 182.0 |
| Saponification value [2] | 189 |
| Color, Gardner | 5 |

[1] The titer noted above is a false titer, since in derivatives, the acid acts as a lower titered acid.
[2] Contains an inter-ester easily broken by saponification techniques.

The alkaline earth metal component of the lubricant can be calcium, strontium, magnesium or barium. Calcium is preferred.

The $C_2$ to $C_4$ fatty acid component can be acetic, propionic or butyric acid. Acetic acid is preferred and can be used in the form of its anhydride.

The thickeners of the invention are preferably prepared by co-neutralizing in lubricating oil, 5.0 to 100.0, preferably 5.0 to 20 mole equivalent proportion of $C_2$ to $C_4$ fatty acid per mole equivalent proportion of iso-oleic acid, with alkaline earth metal base, followed by heating to temperatures of 250° to 550° F., preferably 300° to 400° F., and more preferably 320° to 350° F., in order to dehydrate the lubricant. Alternatively, no external heating may be applied with the result that the water of reaction is left in the lubricant. And in cases where the lubricant is designed for low temperature use this is not objectionable.

The metal base may be an oxide, carbonate or hydroxide of the alkaline earth metal. Calcium hydroxide is preferred.

If desired, preformed metal acetate and preformed metal iso-oleate may be added to oil and heated together, preferably at temperatures of about 300° to 400° F., for 0.5 to 20 hours in order to form the lubricant of the invention. Or preformed metal acetate can be added to the oil, and the metal iso-oleate can be formed in situ by neutralizing the iso-oleic acid with metal base.

The soap-salt thickeners of the invention can also include alkaline earth metal salts and soaps of other acids. For example, salts of about 0.1 to 0.5 mole equivalent proportions of a $C_6$ to $C_{30}$ fatty acid other than iso-oleic acid, per mole equivalent of soap of iso-oleic acid, can also be present in the finished lubricant. Minor amounts of salts of inorganic acid such as phosphoric, nitric, hydrochloric acid, etc. can also be formed during the co-neutralization step noted above by neutralizing the acid with alkaline earth metal base.

The finished lubricant will include greases, fluids and semi-fluids comprising a major proportion of lubricating oil and about 2 to 50 wt. percent, preferably 4 to 30 wt. percent of the thickener. To form greases, generally 10 to 30 wt. percent will be soap-salt, while 2 to 10 wt. percent can be used to form fluid and semi-fluid lubricants.

The lubricating oil may be either a mineral oil or a synthetic oil or a mixture thereof. Such synthetic oils include diesters, complex esters, polysilicones, formals, carbonates, etc.

Various conventional additives may be added to the compositions including oxidation inhibitors such as phenyl α-naphthylamine; rust preventives such as sodium nitrite;

other thickeners such as polyethylene, polypropylene, carbon black, metal soaps, etc.

GREASE A

To demonstrate the inability of the iso-oleic acid by itself to form a useable grease, a simple calcium soap grease was prepared using the iso-oleic acid as the sole thickening agent. This grease was prepared as follows, wherein all parts are by weight:

15 parts of iso-oleic acid (Emery 3286-S acid) and 2.2 parts of hydrated lime were added to 81.8 parts of a mineral lubricating oil of 55 SUS viscosity at 210° F. in a steam-jacketed kettle. The mixture was stirred while heating to a temperature of 300° F. until the grease was dehydrated. The grease was then allowed to cool to 210° F. where 1 part of water was added to form a grease structure. (NOTE.—Addition of minor amounts of water to a simple calcium soap grease is conventional and necessary in order to form a greast structure.) The resulting grease was very cohesive and rubbery. On attempting to use it for lubrication, it tended to ball up and pull away from the moving parts. On further attempted lubrication use, it began to entrap air and finally became fluid with large oil separation.

To illustrate the invention, the following examples were carried out, wherein all parts are by weight.

Example I 67 parts of mineral lubricating oil and 10 parts of hydrated lime were intimately mixed in a steam-jacketed kettle. Next, 11 parts of iso-oleic acid was added and the mixture stirred for 10 minutes in order to insure complete mixing. Acetic anhydride (11 parts) was then slowly added and the temperature rose to 210° F. by the time all the acetic anhydride had been added. At this point the free alkalinity was 0.55%, calculated as sodium hydroxide. External heating was then applied and the temperature of the composition was raised to 310° F. and maintained at this point for about ½ hour, until the grease had become completely dehydrated. The grease was then cooled rapidly to 200° F. by passing cooling water through the kettle jacket and 1 part of phenyl α-naphthylamine as an oxidation inhibitor was added. The grease was further cooled to 100° F. and homogenized in a Morehouse mill operating at 0.003" clearance.

Example II

A grease composition was prepared in the same general manner as that of Example I except that a slightly smaller proportion of lubricating oil was used.

Example III

Another grease was prepared in the same general manner of Example I, but utilizing a molar ratio of acetic anhydride to iso-oleic acid of 20:1.

GREASE B

A comparison grease was prepared in the same general manner as the grease of Example III, except that a molar ratio of 2:1 was used in place of the 20:1 ratio of Example III.

GREASE C

A comparison grease was prepared in the general manner of Example I, but using oleic acid (i.e. the trans form) in a molar ratio of acetic anhydride to oleic acid of 9 to 1.

A ball bearing temperature rise test was carried out on several of the preceding grease compositions. This test consists of packing a 204 ball bearing with the test grease and carrying out the AFBMA-NLGI spindle test for lubrication life operating at 10,000 r.p.m. The temperature rise above ambient room temperature is recorded (no other heat is applied other than that generated in the operating bearing). The length of time that the bearing remains at the elevated temperature is also recorded. In non-channelling grease, i.e. those that do not shear harden, the grease is continuously churned in the bearing and a high operating temperature results and is maintained, during the course of the test. In channelling or shear hardening greases, the grease is initially churned and a small temporary temperature rise occurs as the test begins. However, as soon as the grease shear hardens, it is pushed out of the ball path, and the bearing cools off to approximately room temperature. Channelling greases are desired because of their lower power consumption and cooler operation.

In addition to the above ball bearing test, conventional tests were also made on the compositions prepared above. The compositions tested and the results obtained are summarized in the following table:

TABLE I

| | Examples | | | | | |
|---|---|---|---|---|---|---|
| | A | I | II | III | B | C |
| Iso-oleic acid | 15.0 | 11.0 | 12.0 | 5.6 | | |
| Oleic acid | | | | | | 8.7 |
| Acetic anhydride | | 11.0 | 12.0 | 20.0 | | 14.0 |
| Phenyl α-naphthylamine | | 1.0 | 1.0 | 1.0 | | 1.0 |
| Water | 1.0 | | | | | |
| Hydrated lime | 2.2 | 10.0 | 10.8 | 16.2 | | 12.0 |
| Mineral lubricating oil, 55 SUS. at 210° F. | 81.1 | 67.0 | 64.2 | 57.2 | | 64.3 |
| Mol equivalent ratio, acetic anhydride/iso-oleic | | 5.8/1 | 5.8/1 | 20/1 | 2/1 | 9/1 |
| Properties: | | | | | | |
| Appearance | Very cohesive and rubbery | Non-cohesive grease | | | Very cohesive | |
| Dropping point, ° F. | 500+ | 500+ | 500+ | | 500+ | 500+ |
| Penetrations 77° F. mm/10: | | | | | | |
| Unworked | 265 | 305 | 295 | 330 | | 351 |
| Worked 60 strokes | 300 | 312 | 285 | 330 | | 352 |
| Worked 10,000 strokes | Fluidizes | 295 | 270 | 345 | | 370 |
| Wheel bearing test, 1 hr. tilted 220° F.—No slump, no leakage | | Pass | | Pass | | Fail-slumps |
| Lubrication life in hours [1] (250° F., 10,000 r.p.m.) | | 2000+ | | 2000+ | | 932 |
| Water solubility | | Insoluble | | Insoluble | | Insoluble |
| Shipping stability measured by shaker test | | Excellent | | | | |
| Timken E.P. test in lbs | | 45+ | | 60+ | 35 fail | 35 |
| Ball bearing temp. rise test: | | | | | | |
| Ambient operating temp | 80° F. | | 80° F. | | | |
| Max. bearing temp | 170° F. | | 125° F. | | | |
| Length of time at max. temp. in minutes | Steady state | | 5 | | | |
| Final temperature | 170° F. | | 95° F. | | | |

[1] AFBMA—NLGI spindle test.

As seen by the above table, Grease A resulted in a very cohesive rubbery grease which cannot be satisfactorily used for lubrication. When used at temperatures above 180° F. in order to soften the grease for lubrication, it disintegrated due to loss of water from its structure. At lower temperatures, its rubbery cohesive structure did not permit satisfactory lubrication. In the ball bearing test, Grease A became heated to 170° F. and remained constantly at this temperature. On the other hand, Examples I, II and III of the invention, all resulted in excellent smooth adhesive, but non-cohesive greases having good consistencies and lubrication properties. Grease B, which was prepared at a molar ratio of 2:1 was very cohesive and illustrates the necessity for a higher molar ratio in order to prepare adequate lubricants from the iso-oleic acid. Grease C represents a grease in which conventional oleic acid, i.e. the trans form, had been used in place of the iso-oleic acid. This grease was inferior to the greases of the invention (Examples I to III) in regard to lubrication life or wheel bearing test or extreme pressure properties. Also, it was a softer grease than would have been obtained by use of a like amount of the iso-oleic acid.

While the preceding examples of the invention have utilized elaidic acid in a mixture with other $C_{18}$ acids, elaidic acid may be used in its pure form. For example, Example I can be exactly repeated but using 100% pure elaidic acid in place of the commercial iso-oleic acid used.

What is claimed is:

1. A lubricant comprising a major amount of lubricating oil and within the range of about 2 to 50 wt. percent of a soap-salt thickener consisting essentially of alkaline earth metal salts of $C_2$ to $C_4$ fatty acid and elaidic acid in a molar ratio of about 5 to 20 molar proportions of said alkaline earth metal salt of $C_2$ to $C_4$ fatty acid per molar proportion of said alkaline earth metal salt of elaidic acid.

2. A lubricant according to claim 1, wherein said alkaline earth metal is calcium.

3. A lubricant according to claim 1, wherein said fatty acid is acetic acid.

4. A lubricating grease comprising a major amount of mineral lubricating oil and within the range of 2 to 50 wt. percent of calcium salt of acetic acid and elaidic acid in a molar ratio of about 5 to 20 molar proportions of salt of acetic acid per molar proportion of salt of elaidic acid.

5. A lubricant comprising a major amount of lubricating oil and within the range of 2 to 50 wt. percent of soap-salt thickener, said thickener consisting essentially of alkaline earth metal salt of $C_2$ to $C_4$ fatty acid and iso-oleic acid in a molar ratio of about 5 to 20 molar proportions of $C_2$ to $C_4$ fatty acid salt per molar proportion of iso-oleic acid salt, said iso-oleic acid comprising a major amount of elaidic acid with minor amounts of oleic acid and isomers of oleic acid.

6. A method of preparing the lubricant of claim 1, which comprises neutralizing with alkaline earth metal base, elaidic acid and a member selected from the group consisting of $C_2$ to $C_4$ fatty acid and acetic anhydride, in a lubricating oil menstruum.

References Cited in the file of this patent

UNITED STATES PATENTS

| | | |
|---|---|---|
| 2,588,556 | Moore et al. | Mar. 11, 1952 |
| 2,909,485 | Beerbower et al. | Oct. 20, 1959 |